UNITED STATES PATENT OFFICE.

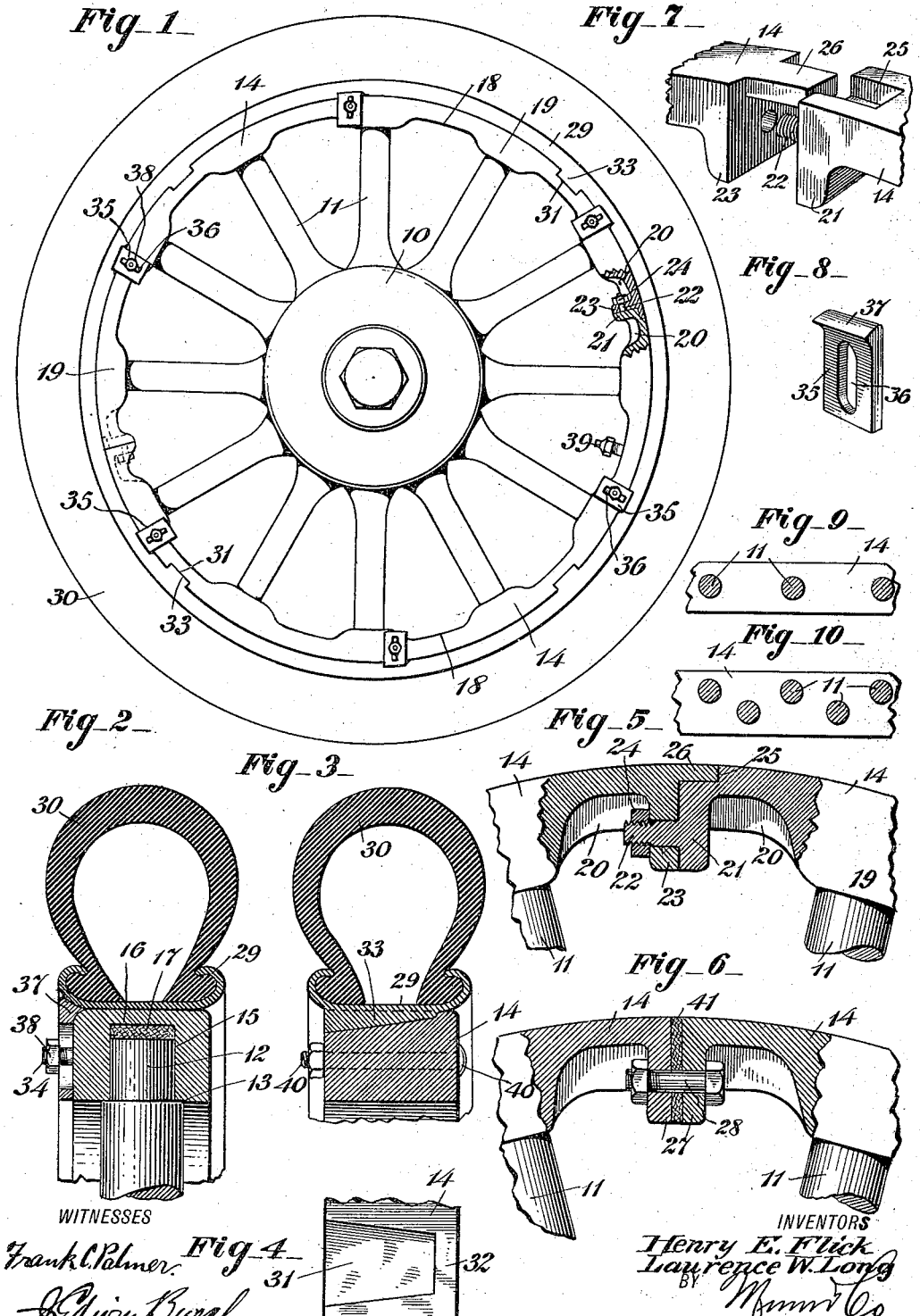

HENRY E. FLICK, OF JACKSON, AND LAURENCE W. LONG, OF DETROIT, MICHIGAN.

ARTILLERY-WHEEL.

1,155,906. Specification of Letters Patent. Patented Oct. 5, 1915.

Application filed June 1, 1914. Serial No. 842,068.

*To all whom it may concern:*

Be it known that we, HENRY E. FLICK, a resident of Jackson, in the county of Jackson and State of Michigan, and LAURENCE W. LONG, a resident of Detroit, in the county of Wayne and State of Michigan, both citizens of the United States, have invented a new and Improved Artillery-Wheel, of which the following is a full, clear, and exact description.

This invention has special reference to vehicle wheels and more particularly to those especially adapted for use on automobiles.

An object of the invention is to provide an improved artillery wheel with a metallic felly comprising sections of novel construction and connection so as to render the wheel extremely strong and durable and capable of withstanding considerable rough usage after being assembled and trued.

With the above and other objects in view, the invention resides in the peculiar combination and arrangement of parts to be hereinafter more fully described, illustrated and claimed, it being also an object to provide a device which is simple in construction, durable and efficient in operation and not likely to get out of order.

Reference is to be had to the accompanying drawings forming a part of this specification, in which similar characters of reference indicate corresponding parts in all the views and in which—

Figure 1 is a side elevation of a wheel constructed in accordance with our invention, with a portion thereof in section to show the manner of connecting the extremities of the sections of the felly; Fig. 2 is an enlarged sectional view through the felly, rim and tire of the wheel, taken on a line of the axis of one of the spokes; Fig. 3 is a similar view taken through one of the driving lugs or studs to prevent movement of the rim on the felly; Fig. 4 is a fragmentary plan view of the felly showing the groove which receives the lug of the rim; Fig. 5 is an enlarged sectional view showing the connecting means between the extremities of the sections of the felly; Fig. 6 is a similar view showing a modified form of connection; Fig. 7 is a detail perspective view showing two extremities of the sections to illustrate their interfitting engagement; Fig. 8 is a perspective view of a wedge by which the rim is held on the felly and the wheel trued up; Fig. 9 is a fragmentary sectional view showing the arrangement of spokes to be employed; and Fig. 10 is a similar view showing a modified arrangement of spokes.

As illustrated, the improved wheel embodies the usual hub 10 having a suitable number of spokes 11 extending radially therefrom and provided at their outer ends with slightly reduced portions 12 producing shoulders 13. These spokes may be arranged in alinement as shown in Fig. 9 or in staggered relation as shown in Fig. 10. It is to be observed, however, that the tenons of the spokes formed by the reduced portions 12 are made nearly as large as the smallest dimension of the spokes in order to give the largest possible bearing surfaces to the ends of the spokes and the slightest bearing surfaces on the shoulders produced by such reduced portions or tenons so as to prevent weakening of the spokes at such points.

The felly of the wheel is preferably made of wrought metal and comprises a pair of semi-circular sections 14 having mortises or sockets 15 for receiving the tenons or reduced portions of the spokes. These mortises or sockets terminate at spaced points from the outer or peripheral face of the felly in order to provide end walls 16, adapted, together with the inner face due to the contact of the shoulders 13 therewith, to take part of the supporting pressure against the ends of the spokes. To further this object and to add resiliency and cushioning action to the wheel, interposed washers 17 are mounted between the ends of the spokes and the walls 16, these washers being preferably made of hard fiber sufficient to transmit shocks and pressure to the end walls but to allow a certain amount of resiliency.

In order to add to the attractiveness of the wheel and to lighten the same, the felly is recessed at points intermediate the spokes, as shown at 18, the portions adjacent to the spokes being enlarged, as shown at 19, so as to provide sockets of sufficient depth to positively retain the spokes in position. At the extremities of the sections the latter are internally recessed, as shown at 20, and one end of each section is provided with an inward extension 21 having a threaded stem 22 formed integral therewith and extending circumferentially therefrom, while the outer end of each section is provided with an apertured inward extension 23 through which the opposed stem is passed and engaged by a jamb nut 24 constituting with the stem a longitudinal fastening means between the co-acting extremities of the sections so they may be drawn tightly together.

In order to further hold the sections together and in alinement one extremity of each section is provided with a peripheral recess 25 communicating with its free end to receive an extension 26 at the end of the adjacent section, these parts inter-fitting to prevent lateral displacement of one section relative to the other and to hold them in positive alinement. As a modified form of connecting means for the sections the extremity of each section may be provided with inward extensions 27 suitably apertured to receive a bolt 28 for connecting the sections, or such fastening means may be used as an emergency or repair device in the event that the stems 22 should break off. In this case the extensions 21 will be drilled through and a bolt passed through the co-acting apertures in the extensions, as illustrated in Fig. 6 of the drawings.

Any suitable rim may be mounted upon the felly but by way of illustration a clencher rim 29 is shown, carrying the usual pneumatic tire 30, and in order to hold the rim against rotation on the felly the latter is provided with transverse grooves 31 at suitably spaced points. These grooves communicate with one edge of the felly and terminate short of the opposite edge thereof to provide intermediate portions 32, and as shown in Fig. 3 of the drawings these grooves are increased in depth toward the edge of the felly with which they communicate and are adapted for engagement by lugs 33 formed with or carried by the rim, and of a cross section corresponding to the shape of the grooves. In this manner the rim can be fitted on the felly from one side and will be held from displacement by the end walls of the grooves in one direction, but in order to hold the rim from displacement in the opposite direction threaded studs 34 are cast or otherwise fixed to the felly preferably adjacent to certain of the spokes and receive wedges or truing plates 35 which are provided with slots 36 so as to permit adjustment of the wedges on the studs to cause the engaging portions or heads 37 of the wedges to contact and conform to the adjacent edge portions of the felly and rim. Thus, when the wedges are forced against the rim to hold the latter against displacement from the felly and to true up the wheel, such wedges may be locked against movement by nuts 38 to form a rigid structure. By means of the slots 36 the wedges or truing plates may be adjusted to compensate for wear of the parts.

In the construction of the wheel the sections are cast in the form shown, and due to their simplicity it will be seen that they can be readily assembled on the spokes after the hub and spokes are connected. The longitudinal connecting means between the extremities of the sections are also desirable owing to the fact that they prevent weakening of the felly at the points of connection of the sections by bridging the co-acting end portions of the sections as distinguished from the radially extending connecting means now commonly employed. The slots of the wedges are made slightly longer than the diameters of the studs so that the wedges may adjust themselves to any variation in the lugs and grooves receiving the same, after the wheel has been trued up. The placing of the valve stem 39 and the driving grooves and lugs will vary with the number of spokes in the wheel, but in either event the lugs of the rim correspond in number to the grooves of the felly so that the rim can be easily fitted on the felly and fastened thereon as described. In lieu of the studs 34 for attaching the wedges or truing plates 35, we provide bolts 40 passed through apertures in the felly, the studs and apertures for the bolts being located to one side of the spokes to obviate weakening of the spokes, especially in the event of the studs breaking and it being necessary to drill holes for inserting bolts in place of the studs for the attachment of the plates. A washer 41 is also placed between the abutting ends of the felly sections for the purpose of taking up the felly should the miters become loose.

Having thus described our invention, what we claim as new and desire to secure by Letters Patent is:—

1. In a vehicle wheel, a felly comprising a pair of metallic sections having inward extensions at their extremities, one of said extensions having an integral threaded stem projecting circumferentially therefrom and the other extension having an aperture receiving said stem therethrough, nuts on the stems, the extremity of one section having in its periphery a recess leading out through its end and the adjacent extremity of the other section having an extension flush with the outer face thereof and engaging said recess to hold the sections against lateral displacement, said felly sections being formed with mortises adapted to receive the extremities of the spokes, and a tire carrying rim mounted on the felly.

2. In a vehicle wheel, a felly comprising a pair of metallic sections having inward extensions at their extremities, one of said extensions having an integral stem projecting circumferentially therefrom and the other extension having an aperture receiving said stem therethrough, nuts engaged on the stem, the extremity of one section having a recess communicating with its free end and the adjacent extremity of the other section having an extension engaging said recess to hold the sections against lateral displacement, said felly sections having spaced peripheral grooves communicating with one edge thereof, a rim having lugs conforming to said grooves and engaging the same when the rim is in position, and means for holding the rim against displacement transversely.

In testimony whereof we, HENRY E. FLICK and LAURENCE W. LONG, have signed our names to this specification in the presence of two subscribing witnesses.

HENRY E. FLICK.
LAURENCE W. LONG.

Witnesses:
J. H. CASTLEMAN,
FRANK A. HALL.

Copies of this patent may be obtained for five cents each, by addressing the "Commissioner of Patents, Washington, D. C."